UNITED STATES PATENT OFFICE.

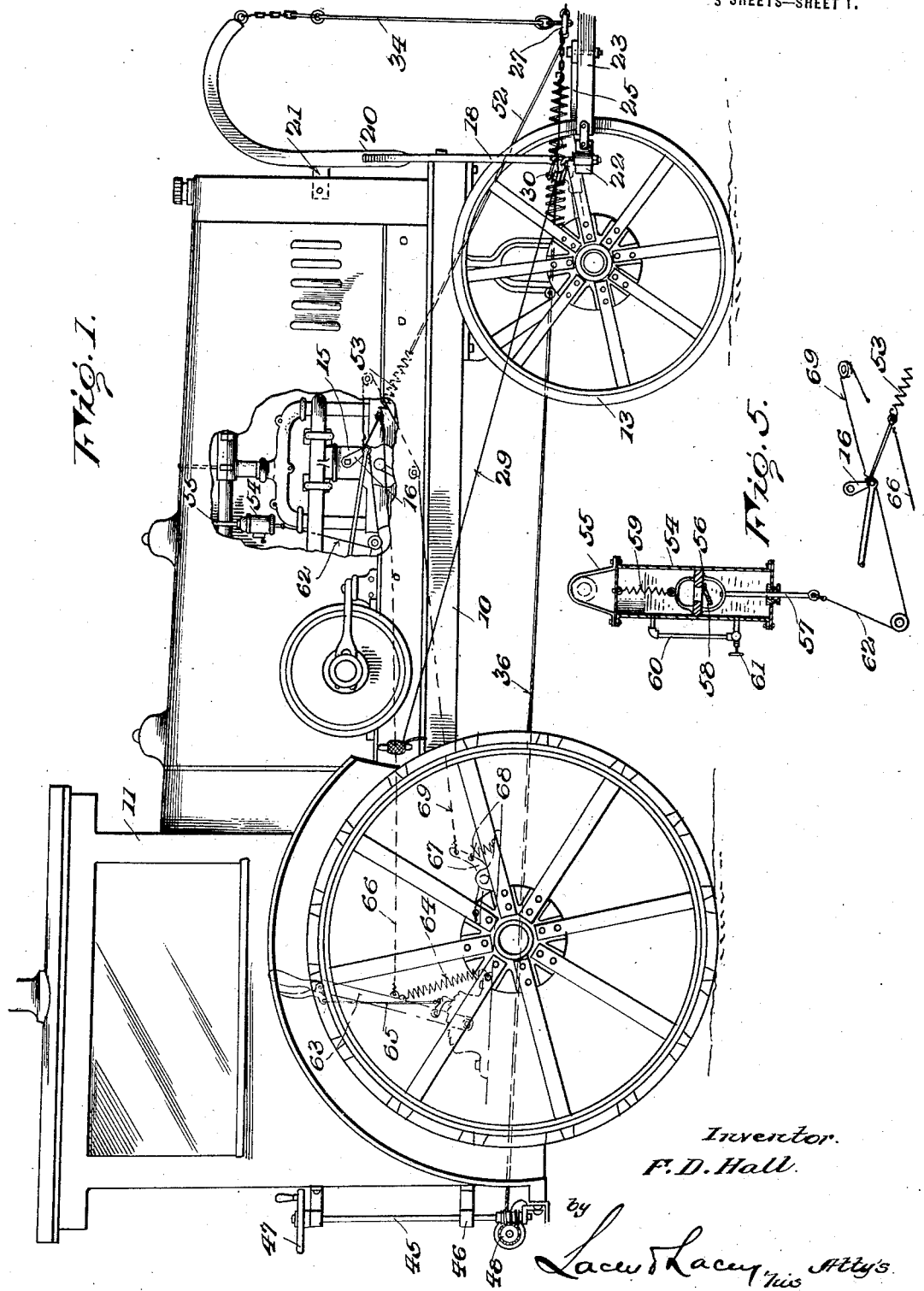

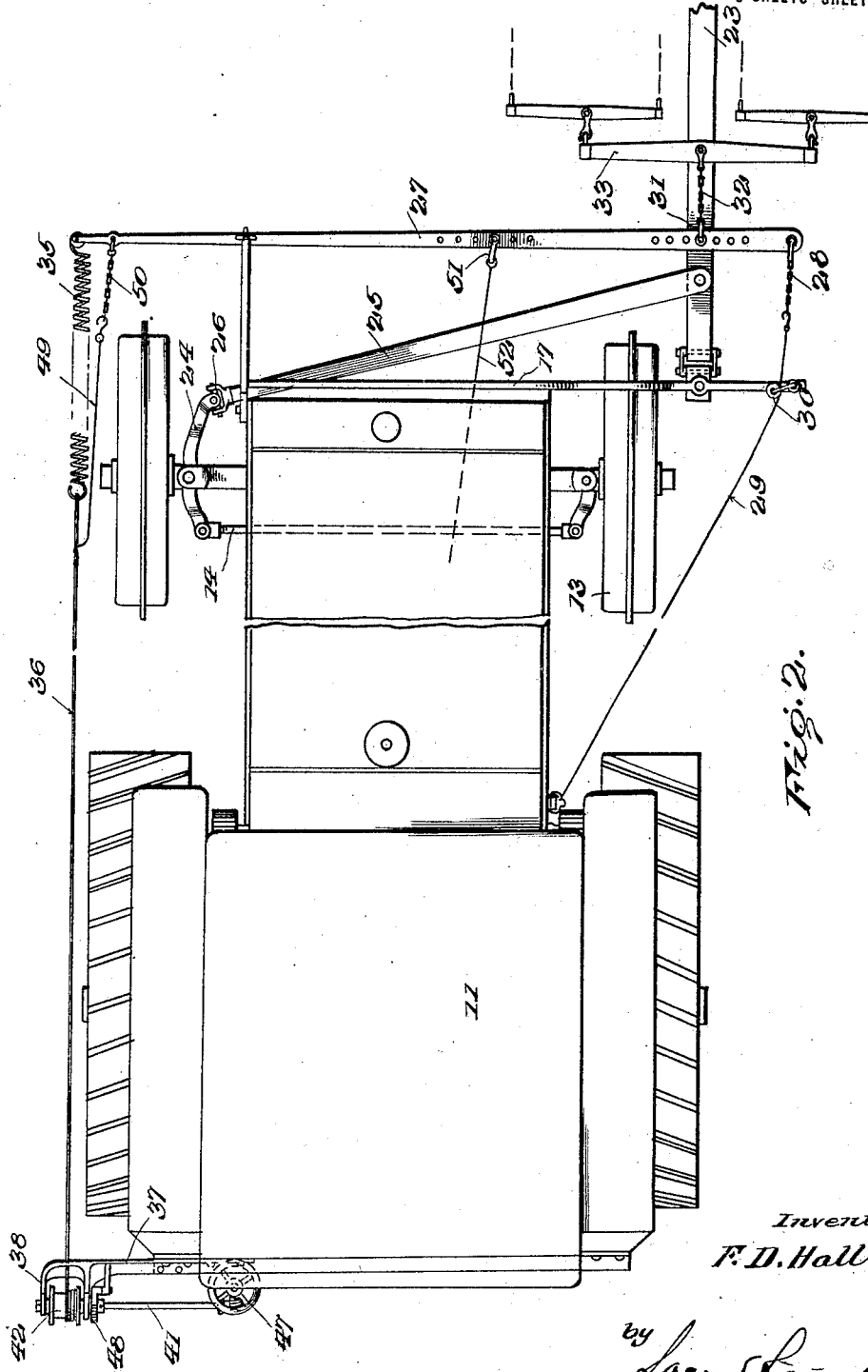

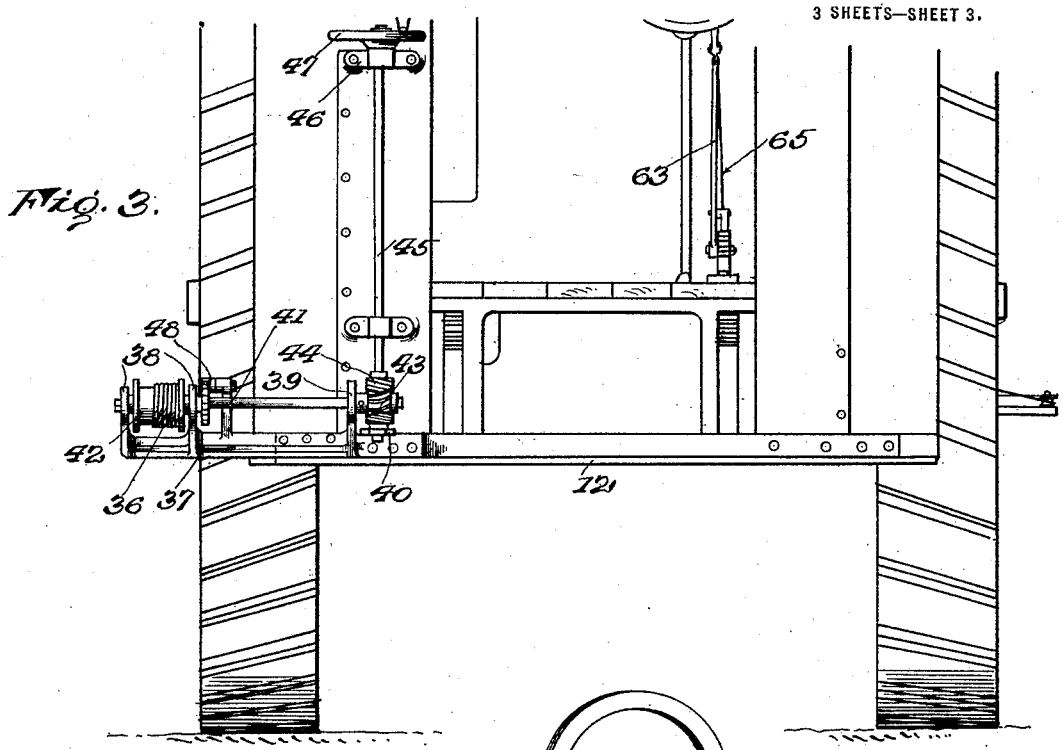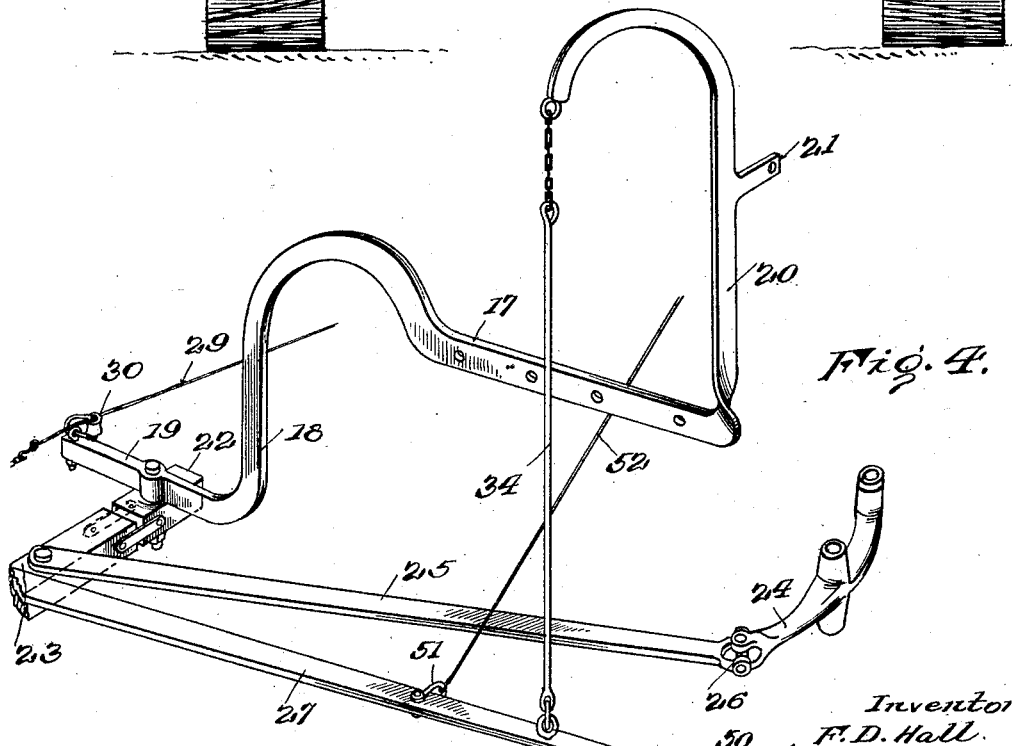

FRED D. HALL, OF CRANDALL, SOUTH DAKOTA, ASSIGNOR OF ONE-HALF TO JACOB LEDERMANN, OF CRANDALL, SOUTH DAKOTA.

DRAFT ATTACHMENT FOR TRACTORS.

1,408,590.　　　　　Specification of Letters Patent.　　Patented Mar. 7, 1922.

Application filed January 29, 1920. Serial No. 354,898.

*To all whom it may concern:*

Be it known that I, FRED D. HALL, citizen of the United States, residing at Crandall, in the county of Day and State of South Dakota, have invented certain new and useful Improvements in Draft Attachments for Tractors, of which the following is a specification.

This invention relates to an improved draft governor for tractors or other motor vehicles and has as one of its principal objects to provide a mechanism whereby a team of horses may be hitched to the tractor for supplementing the motive power thereof.

The invention has as a further object to provide a mechanism whereby a team of horses attached to the tractor can guide the tractor.

A still further object of the invention is to provide a mechanism wherein the motive power of the tractor will be governed by the draft of the team of horses attached thereto.

And the invention has a still further object to provide a mechanism wherein the draft required to effect a given opening of the throttle valve of the tractor may be readily varied.

Other and incidental objects will appear hereinafter.

In the drawings:

Figure 1 is a side elevation showing my improved attachment applied to a conventional type of tractor, parts being broken away, Figure 2 is a plan view particularly illustrating the disposition of the draft bar of the attachment, Figure 3 is a rear elevation showing the winding drum employed for varying the load upon a team attached to the tractor, Figure 4 is a detail perspective view particularly illustrating the bracket employed for supporting the draft bar, and Figure 5 is a detail sectional view showing the dash pot employed in connection with the tractor throttle control.

In order to facilitate an accurate understanding of the present invention, I have shown the invention in connection with a conventional type of tractor. This tractor is formed with the usual chassis frame 10 upon the rear portion of which is mounted the cab 11. A transverse bar 12 extends between the sides of this cab at the rear of the tractor. The front wheels of the tractor are indicated at 13 and the steering knuckles of these wheels are coupled by the usual connecting rod 14 so that the tractor may be steered in the usual manner. The carbureter of the traction engine, as best shown in Figure 1, is indicated at 15. This carbureter has the usual throttle valve operated by a lever 16 whereby the speed of the tractor may be controlled. In applying the present invention, the usual speed governor for the tractor engine is disconnected therefrom or otherwise rendered idle.

In carrying the invention into effect, I employ a bracket 17 of the type illustrated in Figure 4. This bracket is bolted or otherwise secured to the chassis frame 10 at its front end to extend transversely with respect to the tractor and, at one end, is formed with a bowed depending arm 18. This arm extends over the adjacent front wheel of the tractor and is provided with a laterally and outwardly directed lower end portion 19. At the end thereof opposite the arm 18, the bracket is formed with an upstanding arm 20, the upper end portion of which is curved outwardly and forwardly from the tractor. Projecting from said arm is a lug 21 secured to the tractor radiator for bracing the upper end portion of the arm. Swiveled upon the laterally directed portion 19 of the arm 18 is a block 22 and pivotally connected to the forward end of this block is a tongue 23 which may thus be swung both vertically and horizontally. Projecting from the steering knuckle of that front wheel of the tractor lying at the side thereof opposite the tongue 23 is a forwardly directed steering arm 24 and extending between this arm and the inner end portion of the tongue is a steering rod 25. Consequently, as will be seen, the tractor may be guided by the tongue 23. A joint 26 is interposed in the rod 25 to permit vertical movement of the tongue.

Lying across the tongue is a draft bar 27 and connected to one end of this bar is a chain 28. Secured to any suitable portion of the tractor at the adjacent side thereof is a cable 29 which, at its forward end, carries a hook selectively engageable in the links of the chain 28 for varying the effective length of the cable. As best shown in Figures 1 and 2, the cable is trained around a pulley 30 mounted upon the outer end of the laterally directed portion 19 of the arm 18 so that the cable will thus anchor the draft bar 27 at its adjacent end. Connected to the contiguous end portion of the draft bar for adjustment thereon, the bar being as particularly shown in Figure 2, provided with a series of openings for this purpose, is a clevis 31 in which is engaged a chain 32 connecting a double-tree 33 with the bar so that a pair of draft animals at opposite sides of the tongue 23 may pull against the bar. The draft bar is supported in substantially horizontal position by a rod 34 connected by a short length of chain with the arm 20 of the bracket 17 and engaged with the contiguous end of the bar is a spring 35 to which is connected a cable 36. Mounted, as particularly shown in Figure 3, upon the rear transverse bar 12 of the tractor is a bracket 37 projecting laterally beyond the adjacent rear wheel of the tractor and provided with a pair of upstanding bearing lugs 38 and a third upstanding bearing lug 39 alining with the first lugs. A bearing lug 40 projects horizontally from the bracket adjacent the lug 39. Journaled through the lugs 38 and 39 is a horizontal shaft 41 upon which is mounted, between the pair of lugs 38, a winding drum 42 to which is connected the cable 36. Mounted upon the opposite end of said shaft is a worm 43 with which coacts a worm 44 upon a vertical shaft 45 journaled at its lower end through the lug 40 of the bracket. The shaft 45 is connected to the adjacent side of the cab 11 of the tractor by suitable bearings 46 and at its upper end carries a hand wheel 47. Associated with the shaft 41 is a ratchet 48 so that, as will be seen, the hand wheel 47 may be turned for winding the cable 36 upon the drum 42 and consequently inclining the bar 27 horizontally. Connected to the forward end portion of the cable 36 is a short length of cable 49 carrying, at its free end, a hook selectively engageable in the links of a chain 50 connected to the free end of the draft bar. As will be seen, the cable 49 and chain 50 will thus provide a means for adjustably limiting the expansive movement of the spring 35.

Connected to the intermediate portion of the draft bar 27 for adjustment therealong is a clevis 51 and engaged with this clevis is a cable 52 which, as particularly shown in Figure 1, is connected with the throttle valve lever 16 of the carbureter of the tractor engine. A spring 53 is interposed in the cable 52 and is designed to absorb sudden jerks upon the cable. However, to further prevent fluttering of the throttle valve or too sudden opening thereof, I employ a dash pot of the type particularly shown in Figure 5 of the drawings. This dash pot includes a cylinder 54 to the upper end of which is connected a hanger 55 suspending the dash pot from any convenient portion of the tractor engine or associated parts. Mounted to reciprocate within the cylinder is a piston 56 having a piston rod 57 extending through the lower end of the cylinder and mounted upon the piston is a valve 58. Extending between the upper end of the cylinder and the piston is a spring 59 normally tending to retract the piston upwardly within the cylinder and connecting the end portions of the cylinder at opposite sides of the piston is a bypass pipe 60 in which is interposed a valve 61. Connected at one end to the piston rod 57 is a cable 62 which is carried around a suitably located pulley and is engaged at its opposite end with the throttle valve lever 16. The cylinder 54 is suitably filled with oil so that downward movement of the piston will serve to trap a portion of the oil in the lower end of the cylinder, the valve 58 moving to closed position coincident with downward movement of the piston. Thus, downward travel of the piston will be governed by the flow of oil in the lower portion of the cylinder through the bypass 60. However, as will be appreciated, the rate of downward travel of the piston may be readily varied by adjusting the valve 61.

As will now be understood in view of the preceding description, the draft of a team of horses upon the bar 27 will tend to swing the free end of said bar and consequently pull upon the cable 52 so that the spring 53 will be stretched. Then as the piston of the dash pot moves downwardly, the throttle valve of the engine carbureter will be permitted to open. Thus, the motive power of the tractor will be directly governed by the draft upon the draft bar 27 and by adjusting the horizontal inclination of the draft bar, the pull required upon the bar to open the throttle valve may be readily varied. Accordingly, the load upon the draft animals connected to said bar may, in turn, be readily regulated as desired.

Mounted within the tractor cab is a hand lever 63 to which is connected a spring 64 acting to swing the lever forwardly and associated with the lever is a latch 65 for adjustably securing the lever against forward movement. Connected at one end to the lever is a cable 66, the opposite end of which is secured to the cable 52 in the rear of the spring 53. Thus, by manually swinging the lever 63 rearwardly, the portion of the cable between the spring 53 and the lever 16 of the throttle valve of the carbureter may be slackened so that pull upon the draft bar 27 cannot serve to open the throttle. Accordingly, the tractor may be stopped while the engine may be permitted to continue running without likelihood of the draft team racing the motor by pulling upon the draft bar. Within the tractor cab in advance of the lever 63 is a pivoted foot lever 67 to which is connected a spring 68 acting to rock the lever forwardly and connected at one end to the forward end of said lever is a cable 69, which is trained around suitable pulleys and the opposite end of which is connected to the throttle valve lever 16 in such manner that by rocking the lever 67 rearwardly the throttle valve of the carbureter may be opened. As will be seen, the foot lever provides means whereby the speed of the tractor engine may be controlled independently of the draft governor.

Having thus described the invention, what is claimed as new is:

1. The combination with a motor vehicle having steering mechanism, of a draft bar mounted at the forward portion of the vehicle, means anchoring the bar at one end, means yieldably securing the opposite end of the bar, a connection between the intermediate portion of the bar and the throttle valve of the vehicle engine whereby said valve will be opened by pull upon the draft bar, and means interconnecting the draft bar and steering mechanism.

2. The combination with a motor vehicle, of a horizontal draft bar mounted at the forward portion of the vehicle, means anchoring the bar at one end, means yieldably securing the opposite end portion of the bar, a connection between the intermediate portion of the bar and the throttle valve of the vehicle engine and including a dash pot control whereby said valve will be opened by pull upon the draft bar, and manually operable means for adjustably inclining the bar horizontally.

3. The combination with a motor vehicle of a draft tongue mounted at the forward portion of the vehicle, a connection between said tongue and the front wheels of the vehicle whereby the vehicle may be guided by the tongue, draft means mounted adjacent the tongue, and an operative connection between said draft means and the throttle valve of the vehicle engine and including a dash pot control whereby said valve will be opened by pull upon the draft means.

4. The combination with a motor vehicle, of a bracket secured to the forward portion of the vehicle, a draft tongue supported by said bracket, a connection between said tongue and the front wheels of the vehicle whereby the vehicle may be guided by the tongue, a draft bar mounted adjacent the tongue and supported by the bracket, and an operative connection between said bar and the throttle valve of the vehicle engine and including a dash pot control whereby said valve will be opened by pull upon the draft bar.

5. The combination with a motor vehicle, of a draft bar mounted adjacent the forward portion of the vehicle, means anchoring the bar at one end, a spring connected to the opposite end portion of said bar, a cable connected to said spring, a winding drum adjustably rotatable for winding the cable thereon to tilt the bar horizontally, and an operative connection between the intermediate portion of the draft bar and the throttle valve of the vehicle engine whereby said valve will be opened by pull upon said bar.

6. The combination with a motor vehicle, of draft means mounted adjacent the forward portion of the vehicle, an operative connection between said means and the throttle valve of the vehicle engine whereby said valve will be opened by pull upon the draft means, and manually operable means for resisting such pull and temporarily rendering said connection inactive.

In testimony whereof I affix my signature.

FRED D. HALL. [L. S.]